(12) United States Patent
Jaber et al.

(10) Patent No.: US 11,573,206 B2
(45) Date of Patent: Feb. 7, 2023

(54) COMBINED VAPOR AND/OR GAS CONCENTRATION SENSOR AND SWITCH

(71) Applicant: KING ABDULLAH UNIVERSITY OF SCIENCE AND TECHNOLOGY, Thuwal (SA)

(72) Inventors: Nizar Jaber, Thuwal (SA); Mohammad Ibrahim Younis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 303 days.

(21) Appl. No.: 17/040,099

(22) PCT Filed: May 6, 2019

(86) PCT No.: PCT/IB2019/053701
§ 371 (c)(1),
(2) Date: Sep. 22, 2020

(87) PCT Pub. No.: WO2019/215588
PCT Pub. Date: Nov. 14, 2019

(65) Prior Publication Data
US 2021/0025851 A1 Jan. 28, 2021

Related U.S. Application Data

(60) Provisional application No. 62/667,911, filed on May 7, 2018.

(51) Int. Cl.
*G01N 29/036* (2006.01)
*G01N 29/02* (2006.01)
(Continued)

(52) U.S. Cl.
CPC ............. *G01N 29/036* (2013.01); *G01H 3/08* (2013.01); *G01H 13/00* (2013.01);
(Continued)

(58) Field of Classification Search
CPC ............... G01N 29/036; G01N 29/022; G01N 2291/021; G01N 2291/02809;
(Continued)

(56) References Cited

U.S. PATENT DOCUMENTS 8,168,120 B1 * 5/2012 Younis ................. G01N 29/022
422/68.1
2015/0177196 A1 6/2015 Sussner et al.
(Continued)

OTHER PUBLICATIONS

U.S. Notice of Allowance issued in corresponding/related U.S. Appl. No. 16/982,854 dated Nov. 18, 2021.
(Continued)

*Primary Examiner* — Benjamin R Schmitt
(74) *Attorney, Agent, or Firm* — Patent Portfolio Builders PLLC

(57) ABSTRACT

A combined vapor and/or gas concentration sensor and switch includes a resonating structure, a first alternating current, AC, voltage source coupled to a drive electrode, the first AC voltage source providing the resonating structure with a first voltage having an amplitude causing a first vibration mode of the resonating structure to exhibit a pull-in band and having a first frequency response adjacent to the pull-in band, where the first frequency response is nonlinear, a second AC voltage source coupled to the drive electrode and providing a second voltage having a frequency so that a second frequency response of the resonant structure, adjacent to a third vibration mode, is linear, and a read-out circuit coupled configured to determine a vapor and/or gas concentration based on a difference between (1)

(Continued)

the frequency of the second voltage and (2) a frequency obtained by the read-out circuit from the resonating structure.

20 Claims, 10 Drawing Sheets

(51) Int. Cl.
    *G01N 29/32*       (2006.01)
    *G01H 3/08*        (2006.01)
    *G01H 13/00*      (2006.01)

(52) U.S. Cl.
    CPC .......... *G01N 29/022* (2013.01); *G01N 29/326* (2013.01); *G01N 2291/021* (2013.01); *G01N 2291/02809* (2013.01); *G01N 2291/02881* (2013.01); *G01N 2291/0427* (2013.01)

(58) Field of Classification Search
    CPC ....... G01N 2291/0427; G01N 33/0027; G01H 3/04; G01H 3/08; G01H 13/00
    See application file for complete search history.

(56) References Cited

U.S. PATENT DOCUMENTS

2017/0148592 A1*  5/2017  Tabib-Azir .......... H01L 41/1136
2017/0269052 A1   9/2017  Adams et al.
2018/0052124 A1   2/2018  Rogers et al.

OTHER PUBLICATIONS

Bouchaala, A., et al., "A Smart Microelectromechanical Sensor and Switch Triggered by Gas," Applied Physics Letters, Jul. 5, 2016, vol. 109, p. 013502-1-013502-4, AIP Publishing.

International Search Report in corresponding/related International Application No. PCT/IB2019/053700, dated Dec. 17, 2019.

International Search Report in corresponding/related International Application No. PCT/IB2019/053701, dated Aug. 8, 2019.

Jaber, N., et al., "Resonant Gas Sensor and Switch Operating in Air With Metal-Organic Frameworks Coating," Journal of Microelectromechanical Systems, Apr. 2018, vol. 27, pp. 156-163, IEEE.

Jaber, N., et al., "Sensitive Resonant Gas Sensor Operating in Air with Metal Organic Frameworks Coating," 2017 19th International Conference on Solid-State Sensors, Actuators and Microsystems (Transducers), IEEE, Jun. 18, 2017, pp. 1081-1087.

Kazmi, S.N.R., et al., "Mechanical Computing Using Multifrequency Excited NEMS Resonator," Proceedings of the 13th Annual IEEE International Conference on Nano-Micro Engineered and Molecular Systems (NEMS), IEEE, Apr. 22, 2018, pp. 229-233.

Ramini, A., et al., "Mixed Frequency Excitation of an Electrostatically Actuated Resonator," Microsystem Technologies, Apr. 24, 2015, vol. 22, No. 8, pp. 1967-1974, Springer.

Written Opinion of the International Searching Authority in corresponding/related International Application No. PCT/IB2019/053700, dated Dec. 17, 2019.

Written Opinion of the International Searching Authority in corresponding/related International Application No. PCT/IB2019/053701, dated Aug. 8, 2019.

* cited by examiner

COMBINED VAPOR AND/OR GAS CONCENTRATION SENSOR AND SWITCH

CROSS-REFERENCE TO RELATED APPLICATIONS

This application is a U.S. National Stage Application of International Application No. PCT/IB2019/053701, filed on May 6, 2019, which claims priority to U.S. Provisional Patent Application No. 62/667,911, filed on May 7, 2018, entitled "MULTIMODE MEMS RESONANT SENSOR FOR SMART FUNCTIONALITIES," the disclosures of which are incorporated herein by reference in their entirety.

BACKGROUND

Technical Field

Embodiments of the subject matter disclosed herein generally relate to a single resonating structure that can sense vapor and/or gas concentration and act as a switch when the vapor and/or gas concentration exceeds a predetermined concentration.

Discussion of the Background

Gas sensors are of critical importance in a wide range of applications, including detecting gas leaks, as well as in aerospace and health monitoring applications. The sensing of gas concentrations is typically performed for health and safety reasons, and thus it is desirable to couple a gas sensor with a switch controlling the source of gas so that when the gas concentration exceeds a certain threshold level (either at a safety level or prior to reaching the safety level), the source of the gas is switched off. This typically requires a gas sensor and a separate switch. In order for the switch to be operated, a complicated circuit and microcontroller is coupled between the gas sensor and switch so that when the microcontroller determines that the threshold level of gas concentration has been reached, or has been exceeded, the microcontroller actuates the switch to shut-off the gas source. This results in a large and expensive device to achieve both gas concentration determination and associated switching.

Previously, a resonating structure has been employed to provide a combined gas sensor and switch by employing the first vibration mode of the resonant structure. This was achieved by suppling the resonating structure with a single alternating current (AC) voltage having a voltage amplitude causing the first vibration mode to exhibit a pull-in band and a frequency near pull-in band. Thus, as the gas concentration exceeds a predetermined concentration level, the resonant frequency in the first vibration mode shifts into the pull-in band and the resonating structure collapses and thus can switch on or off another device or circuit.

Gas concentration values obtained using the first vibration mode of a resonating structure typically deviate from the actual concentration, with the deviation typically being an under-measurement of the actual concentration. Operating the resonating structure near the pull-in band of the first vibration mode reduces this deviation. Nonetheless, the deviation is typically still greater than what is desired for practical applications. Thus, prior to reaching the predetermined concentration, this resonating structure will produce vapor and/or gas concentration measurements that are not completely accurate, and accordingly a person reading the obtained measurements will not necessarily be informed of the exact vapor and/or gas concentration, which can lead to safety issues.

Thus, there is a need for a device that uses a single resonating structure that can accurately measure gas concentration and automatically act as a switch when the gas concentration meets or exceeds a predetermined concentration.

SUMMARY

According to an embodiment, there is a combined vapor and/or gas concentration sensor and switch that includes a resonating structure having a first side with a functionalized surface and a second side that is opposite the first side. The resonating structure has a first resonant frequency of a first vibration mode and a third resonant frequency of a third vibration mode. The resonating structure is a resonating microstructure or nanostructure. The sensor also includes a drive electrode and a sensing electrode arranged facing the second side of the resonating structure. A direct current bias source is coupled to the resonating structure. A first alternating current (AC) voltage source is coupled to the drive electrode. The first AC voltage source provides the resonating structure, via the drive electrode, with a first voltage having an amplitude causing the first vibration mode of the resonating structure to exhibit a pull-in band and having a frequency adjacent the pull-in band of the first mode. A second AC voltage source is coupled to the drive electrode. The second AC voltage source provides the resonating structure, via the drive electrode, with a second voltage having a frequency corresponding to the third resonant frequency. A read-out circuit is coupled to the sensing electrode and the sensing electrode. The read-out circuit is configured to determine a vapor and/or gas concentration based on a difference between the frequency of the second voltage supplied by the second AC voltage source and a frequency obtained by the read-out circuit from the resonating structure via the sensing electrode.

According to another embodiment, there is a method for a combined vapor and/or gas concentration sensor and switch. A direct current bias voltage is applied to a resonating structure. The resonating structure has a first side with a functionalized surface and a second side that is opposite the first side. The resonating structure has a first resonant frequency of a first vibration mode and a third resonant frequency of a third vibration mode. The resonating structure is a resonating microstructure or nanostructure. A first alternating current (AC) voltage is applied to the resonating structure via a drive electrode, which is arranged facing the second side of the resonating structure. The first AC voltage provides the drive electrode with a first voltage having an amplitude causing the first vibration mode of the resonating structure to exhibit a pull-in band and having a frequency adjacent the pull-in band of the first mode. A second AC voltage is applied to the resonating structure via the drive electrode. The second AC voltage provides the drive electrode with a second voltage having a frequency corresponding to the third resonant frequency. The vapor and/or gas concentration are determined based on a difference between the frequency of the second AC voltage and a read-out frequency. The resonating structure collapse responsive to the vapor and/or gas concentration exceeding a predetermined concentration.

According to a further embodiment, there is a method for forming a combined vapor and/or gas concentration sensor and switch. A resonating structure, a drive electrode, and a sensing electrode are provided. The resonating structure has a first side with a functionalized surface and a second side that is opposite the first side. The resonating structure has a first resonant frequency of a first vibration mode and a third resonant frequency of a third vibration mode. The resonating structure is a resonating microstructure or nanostructure. The drive and sensing electrodes face the second side of the resonating structure. A direct current bias source is coupled to the resonating structure. A first alternating current (AC) voltage source is coupled to the drive electrode. The first AC voltage source provides the resonating structure, via the drive electrode, with a first voltage having an amplitude causing the first vibration mode of the resonating structure to exhibit a pull-in band and having a frequency adjacent the pull-in band of the first mode. A second AC voltage source is coupled to the drive electrode. The second AC voltage source provides the resonating structure, via the drive electrode, with a second voltage having a frequency corresponding to the third resonant frequency. A read-out circuit is coupled to the sensing electrode. The read-out circuit is configured to determine a vapor and/or gas concentration based on a difference between the frequency of the second voltage supplied by the second AC voltage source and a frequency obtained by the read-out circuit from the resonating structure via the sensing electrode.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a beam resonator. However, the embodiments are equally applicable to any type of resonating structure.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
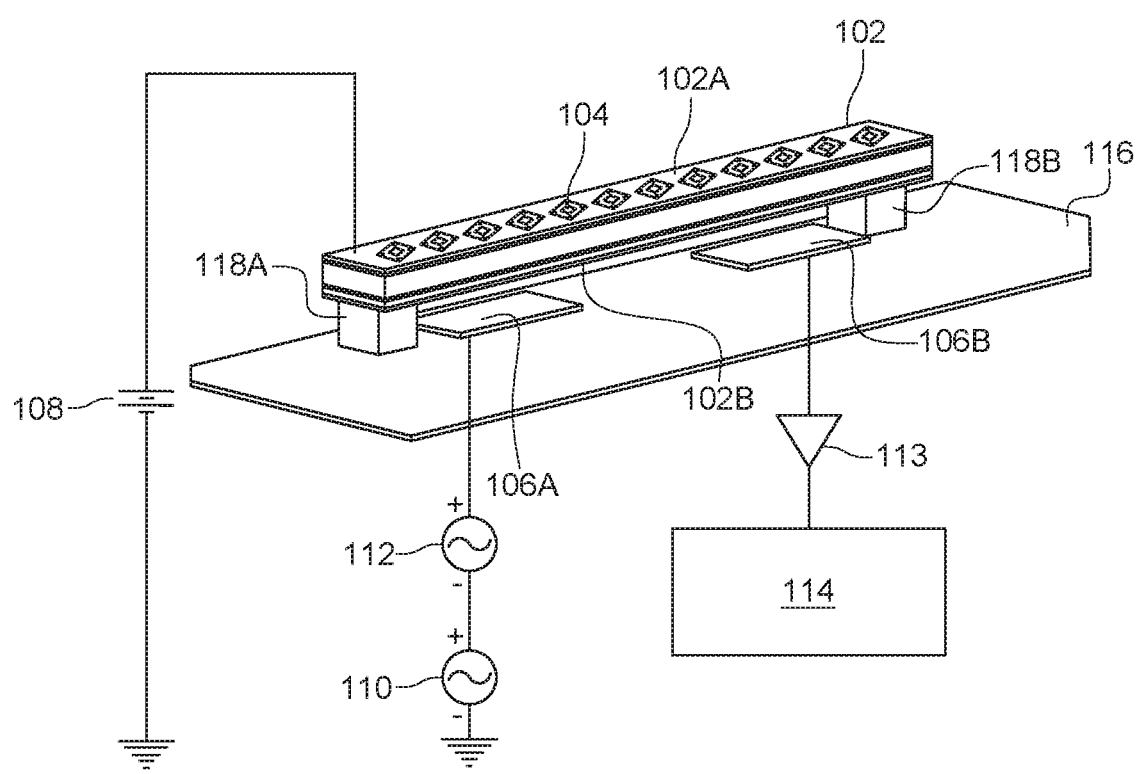
FIG. 1A is a schematic diagram of a combined vapor and/or gas concentration sensor and switch according to embodiments.

FIG. 1A is a schematic diagram of a combined vapor and/or gas concentration sensor and switch according to embodiments. The combined vapor and/or gas concentration sensor and switch 100 includes a resonating structure 102 having a first side 102A with a functionalized surface 104 and a second side 102B that is opposite the first side 102A. The resonating structure 102 has a first resonant frequency of a first vibration mode and a third resonant frequency of a third vibration mode. The resonating structure 102 is a resonating microstructure or nanostructure. A drive electrode 106A and a sensing electrode 106B are arranged facing the second side 102B of the resonating structure 102. A direct current bias source 108 is coupled to the resonating structure 102. A first alternating current (AC) voltage source 110 is coupled to the drive electrode 106A. The first AC voltage source 110 provides the resonating structure 102, via the drive electrode 106A, with a first voltage having an amplitude causing the first vibration mode of the resonating structure 102 to exhibit a pull-in band and having a frequency adjacent the pull-in band of the first mode. A second AC voltage source 112 is coupled to the drive electrode 106A. The second AC voltage source 112 provides the resonating structure 102, via the drive electrode 106A, with a second voltage having a frequency corresponding to the third resonant frequency. A read-out circuit 114 is coupled to the sensing electrode 106B. The read-out circuit 114 is configured to determine a vapor and/or gas concentration based on a difference between the frequency of the second voltage supplied by the second AC voltage source 112 and a frequency obtained by the read-out circuit 114 from the resonating structure 102 via the sensing electrode 106B.

By providing the resonating structure 102, via the drive electrode 106A, with a first voltage having an amplitude causing the first vibration mode to exhibit a pull-in band and having a frequency adjacent the pull-in band of the first mode, a shift in the frequency at the first vibration mode into the pull-in band, due to a predetermined concentration of environmental vapor and/or gas adhering to the functionalized surface 104 of the resonating structure 102, the resonating structure 102 collapses, and thus acts as a switch. The switch can be coupled to, for example, a source of the supply of the gas. Alternatively, or additionally, the source can be coupled to other equipment that may be dangerous to operate at vapor and/or gas concentration levels at or above the predetermined concentration, such as equipment producing open flames, electrical circuits, etc.

The read-out circuit 114 can be any type of electronics configured to determine frequency shifts in the resonance of the resonating structure 102 via the sensing electrode 106B. Specifically, the resonating structure 102 and the sensing electrode 106A form an air capacitor, and thus the read-out circuit 114 can determine the frequency shifts based on capacitance values read-out from the resonating structure 102 via the sensing electrode 106B. The read-out circuit can comprise a processor, field programmable gate array (FPGA), application specific integrated circuit (ASIC), etc. The read-out circuit 114 can also include a memory to store measurements of the vapor and/or gas concentration, as well as a display to display such values and/or a wireless transceiver to transmit these values to another device. Further, the read-out circuit can include a look-up table correlating frequency values of the particular vibration modes with vapor and/or gas concentration. In the illustrated embodiment, the read-out circuit 114 is coupled to the sensing electrode 106B via a lower noise amplifier 113, which can be omitted if amplification is not required by the read-out circuit 114 to read the signal from the sensing electrode 106B.

In the embodiment illustrated in FIG. 1A, the electrodes 106A and 106B are in a two-thirds electrode configuration formed by the drive 106A and sensing 106B electrodes being symmetrically arranged along the length of the resonating structure 102, which reduces the voltage amplitudes required to excite the third vibration mode compared to a full electrode configuration, i.e., an electrode that is continuous along the length of the resonating structure.

Figure 1B:
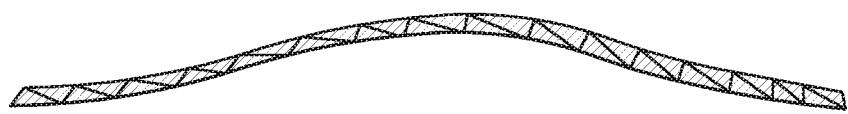
FIG. 1B is a schematic diagram of a resonating structure excited in the first vibration mode according to embodiments.
Figure 1C:
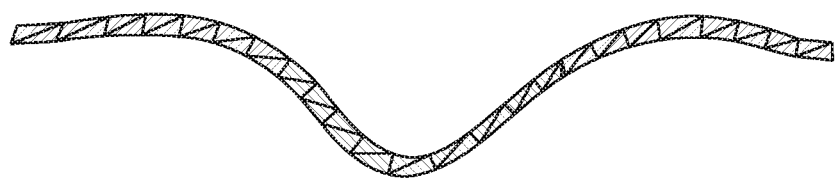
FIG. 1C is a schematic diagram of a resonating structure excited in the third vibration mode according to embodiments.

As those skilled in the art will recognize, resonators, such as the illustrated clamped-clamped beam, can exhibit different vibration modes depending upon the particular frequency applied to the resonator. Specifically, as illustrated in FIG. 1B, the first vibration mode of a resonator is a symmetrical mode in which the resonating structure curves upward in a symmetrical fashion between its two ends. As illustrated in FIG. 10, the third vibration mode of a resonator is also a symmetrical mode in which the middle portion bends downward and the two outer portions bend upwards. The particular applied frequency inducing any particular vibration mode depends on the size and material of the resonator. Thus, the first and third vibration mode frequencies discussed above will vary depending upon the size and material of the resonating structure 102.

The resonating structure 102 is described as a resonating microstructure or nanostructure. Those skilled in the art will recognize that a microstructure has its maximum dimensions in the hundreds of micrometers and a nanostructure has its maximum dimensions in the hundreds of nanometers.

Returning to FIG. 1A, the sensor 100 also includes a substrate 116 on which the resonating structure 102, the drive electrode 106A, and the sensing electrode 106B are arranged. In the embodiment illustrated in FIG. 1A, the resonating structure is a clamped-clamped beam, and thus posts 118A and 118B are interposed between the resonating structure 102 and the substrate 116. When the resonating structure 102 is configured as a cantilever beam (not illustrated), there will be a single post interposed between the resonating structure 102 and the substrate 116.

In order to reduce the effect of squeeze film damping, a number of perforations (not illustrated) can be formed through the drive electrode 106A and the substrate 116, as well as through the sensing electrode 106B and the substrate. Thus, in the locations where the electrodes 106A and 106B are on top of the substrate 116, the perforations pass through both the electrode 106A or 106B and the substrate 116 underneath. As will be described in more detail below, the resonating structure 102 comprises a polymer interposed between two contact layers, the upper contact layer being functionalized with metal organic framework (MOF). The particular MOF is selected based on the particular type of vapor and/or gas being sensed, and thus the first side 102A of the resonating structure 102 is functionalized by the MOF to detect the particular type of vapor and/or gas being sensed.

The direct current bias source and the first 110 and second 112 AC voltage sources can be embodied by any type of source that can provide the required voltage to the resonating structure 102. Further, the first AC voltage source 110 has been described as providing the resonating structure 102 with a voltage having a frequency adjacent to the first vibration mode frequency and the second AC voltage source 112 providing the resonating structure 102 with a voltage having a frequency corresponding to the third vibration mode. As will be appreciated from the discussion below, the frequencies of the voltages provided by the first and second AC voltage sources 110 and 112 are offset from the corresponding frequencies of the first and third vibration modes. In the case of the first voltage AC voltage source, this offset ensures that the resonating structure does not collapse until the frequency is shifted into the pull-in band of the first vibration mode.

Figure 2:
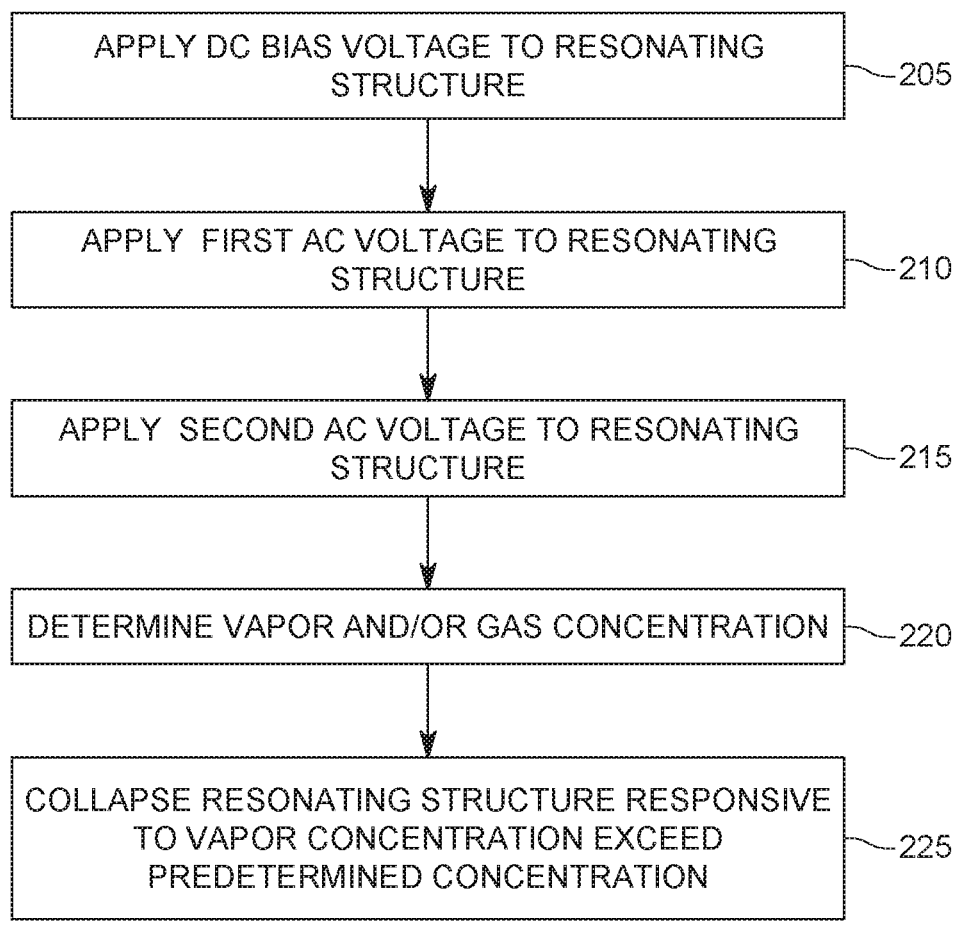
FIG. 2 is a flow diagram of a method for using a combined vapor and/or gas concentration sensor and switch according to embodiments.

FIG. 2 is a flow diagram of a method for using a combined vapor and/or gas concentration sensor and switch according to embodiments. A direct current bias voltage is applied to a resonating structure 102 (step 205). The resonating structure 102 has a first side 102A with a functionalized surface 104 and a second side 102B that is opposite the first side 102A. The resonating structure 102 has a first resonant frequency of a first vibration mode and a third resonant frequency of a third vibration mode. The resonating structure 102 is a resonating microstructure or nanostructure. A first AC voltage is applied to the resonating structure 102 via a drive electrode, which is arranged facing the second side 102B of the resonating structure 102 (step 210). The first AC voltage provides the resonating structure 102, via the drive electrode 106A, with a first voltage having an amplitude causing the first vibration mode of the resonating structure 102 to exhibit a pull-in band and having a frequency adjacent the pull-in band of the first mode. A second AC voltage is also applied to the resonating structure 102 via the drive electrode 106A (step 215). The second AC voltage provides the resonating structure 102, via the drive electrode 106A, with a second voltage having a frequency corresponding to the third resonant frequency.

The vapor and/or gas concentration is determined based on a difference between the frequency of the second AC voltage and a read-out frequency (step 220). The resonating structure 102 collapses responsive to the vapor and/or gas concentration exceeding a predetermined concentration (step 225). If, however, the vapor and/or gas concentration determined using the first vibration mode does not exceed the predetermined concentration, then the resonating structure will not collapse. The frequency of the first voltage is selected based on the predetermined concentration. This can involve, for example, determining a frequency shift of the first mode of the resonating structure 102 when the resonating structure 102 is exposed to the predetermined concentration and selecting the frequency of the first voltage to be a frequency that is a difference between an initial frequency of the pull-in band of the first mode and the determined frequency shift.

Although FIG. 2 illustrates the voltage sources being connected in a particular order, these sources can be connected in parallel or in a different order so long as all three are applied during use of the device. Although the resonance at the first vibration mode is employed solely for switching, this resonance can also be read-out by the read-out circuit 114, if one desires to obtain the frequency shift, and corresponding vapor and/or gas concentration reading, based on the shift in the frequency for the first vibration mode.

Figure 3:
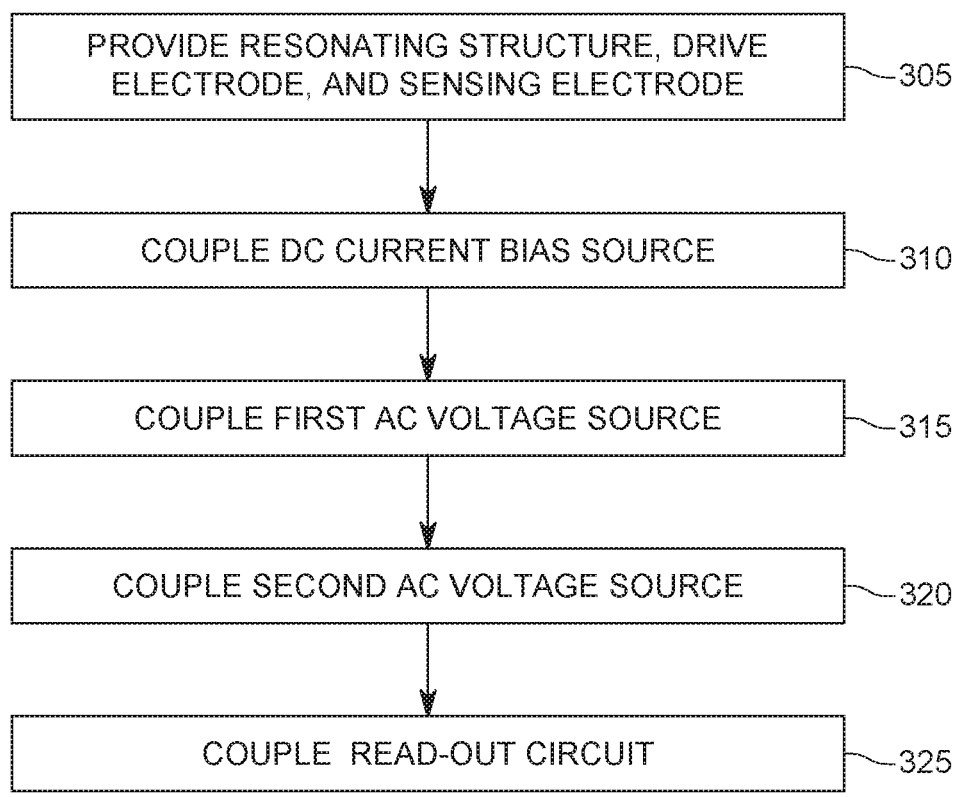
FIG. 3 is a flow diagram of a method for making a combined vapor and/or gas concentration sensor and switch according to embodiments.

FIG. 3 is a flow diagram of a method for making a combined vapor and/or gas concentration sensor and switch according to embodiments. Initially, a resonating structure 102, a drive electrode 106A, and a sensing electrode 106B are provided (step 305). The resonating structure 102 has a first side 102A with a functionalized surface 104 and a second side 102G that is opposite the first side 102A. The resonating structure 102 has a first resonant frequency of a first vibration mode and a second resonating frequency of a second vibration mode. The resonating structure 102 is a resonating microstructure or nanostructure. The drive 106A and sensing 106B electrodes face the second side 102B of the resonating structure 102.

The resonating structure 102, the drive electrode 106A, and the sensing electrode 106B can be formed in any manner. Although a non-limiting example of one way to form these components will now be described, the resonating structure 102, drive electrode 106A, and sensing electrode 106B can be formed using other methods and having other dimensions. The resonating structure can be fabricated on, for example, a 4" silicon wafer covered with 3 μm of silicon dioxide ($SiO_2$) layer, which insulates the device layers from the conductive silicon layer. The lower, drive and sensing electrodes and on-chip connections can be formed by sputtering and patterning Cr/Au layer of 50/200 nm thicknesses. The Cr enhances the adhesion of gold with other materials. The resonating structure can be formed by spinning and curing a 4.2 μm polyimide coated from the bottom with Cr/Au/Cr layer of thicknesses 50/200/50 nm. Also, the resonating structure can be coated from the top with Cr/Au layer of thickness of 50/200 nm, which acts as a hard mask to protect the resonating structure during the etching process of the polyimide.

The drive 106A and sensing 106B electrodes can be separated by a 3.3 μm sacrificial layer of amorphous silicon (α-Si), which are etched in the final release process to form the air gap. This resonating structure can be functionalized with a COOH— terminated layer by immersing the chip in ethanolic solution of 16-mercaptohexadecanoic acid for 24 hours. Using the layer-by-layer approach, a uniform MOF layer can be grown by dipping the chip in copper acetate metal precursor ethanolic solution and organic ligand (terephthalic acid (bcd)) ethanolic solution for five and ten minutes, respectively, to grow the Cu(bcd).$xH_2O$ MOF thin film. The process can repeated, for example, for ten cycles where the chip is rinsed with ethanol every cycle.

Figure 4:
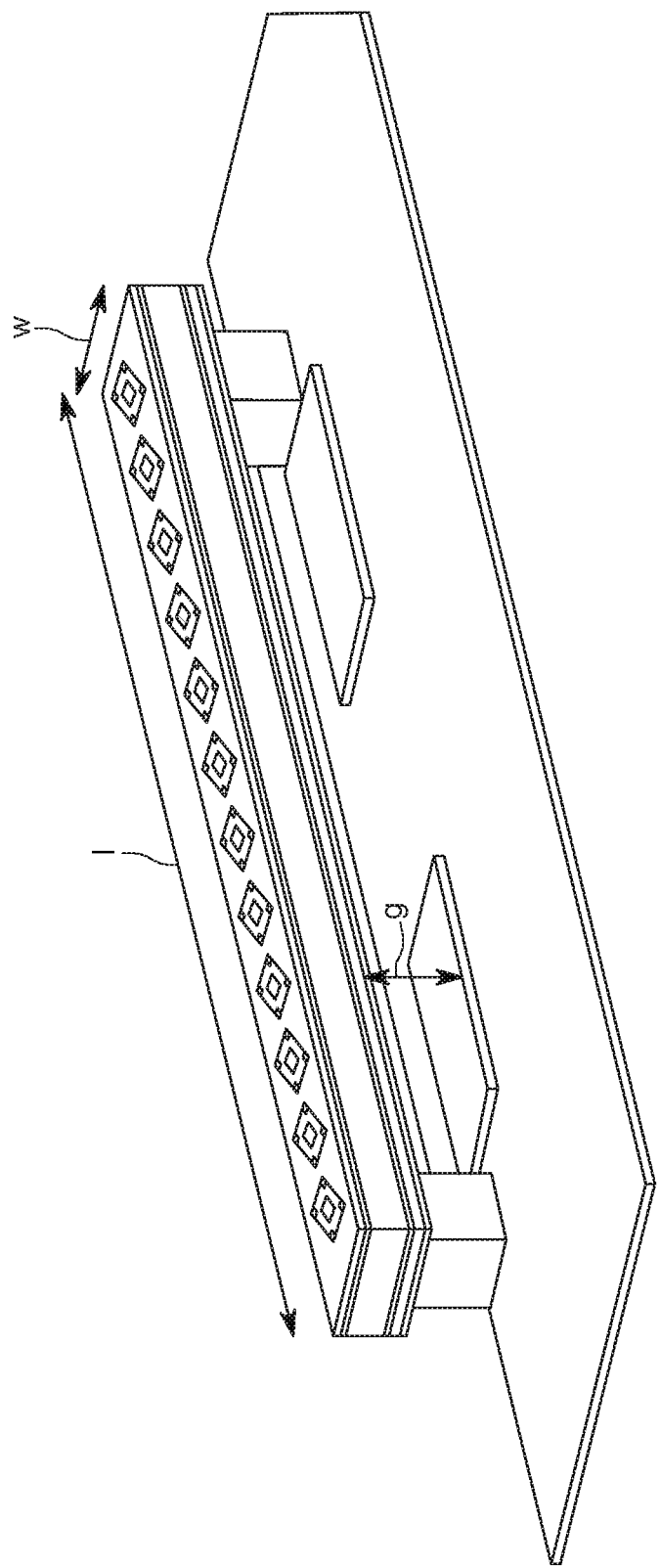
FIG. 4 is a schematic diagram of a resonating structure and electrode of a combined vapor and/or gas concentration sensor and switch according to embodiments.

Referring now to FIG. 4, the resulting resonating structure has the following dimensions: length (l) 500 μm; width (w) 20 μm; and gap (g) 3.3 μm. These dimensions were selected to minimize the squeeze film damping in accordance with known fabrication process rules.

Returning to FIG. 3, a direct current bias source 108 is coupled to the resonating structure 102 (step 310). A first AC voltage source 110 is coupled to the drive electrode 106A (step 315). The first AC voltage source 110 provides the resonating structure 102, via the drive electrode 106A, with a first voltage having an amplitude causing the first vibration mode to exhibit a pull-in band and having a frequency adjacent the pull-in band of the first mode. A second AC voltage source 112 is coupled to the drive electrode 106A (step 320). The second AC voltage source 112 provides the resonating structure 102, via the drive electrode 106A, with a second voltage having a frequency corresponding to the third resonant frequency. A read-out circuit 114 is coupled to the sensing electrode 106B (step 325). The read-out circuit 114 is configured to determine a vapor and/or gas concentration based on a difference between the frequency of the second voltage supplied by the second AC voltage source 112 and a frequency obtained by the read-out circuit 114 from the resonating structure 102 via the sensing electrode 106B. Although the method has been described in connection with FIG. 3 involving a serial connection of the voltage sources and the read-out circuit, these connections can be performed in parallel and/or in a different order from what was discussed above.

A resonating structure formed in the manner described above and having the dimensions described above was subjected to frequency response, noise, operating point, sensitivity, and switching analysis. The analysis involved using a laser Doppler vibrometer (instead of a sensing electrode) to measure the resonance frequency values and their corresponding mode shapes, record the frequency response curves, and track the change in the amplitude of vibration due to water vapor exposure. A data acquisition card (DAQ) was connected to an amplifier to actuate the resonating structure with a wide range of frequencies and voltage amplitudes. Using LabVIEW software, the measured real-time data were post-processed to generate the frequency response curves and the frequency shift due to water vapor exposure. The resonating structure was placed into the test chamber, which is equipped with ports to provide the actuation signals. The water vapor was generated by flowing nitrogen inside a bubbler placed in a controlled temperature bath. The water vapor concentration was governed by controlling the flow of the dry nitrogen line and bubbler line.

The frequency analysis involves experimentally extracting the resonance frequency values by actuating the resonating structure with white noise signal while scanning the response at different points along the length of the resonating structure. The test was conducted under vacuum conditions where the chamber pressure was fixed at 4 mTorr. The measured frequency values near the first and third vibration modes were 79.26 kHz and 345.4 kHz, respectively.

Figure 5A:
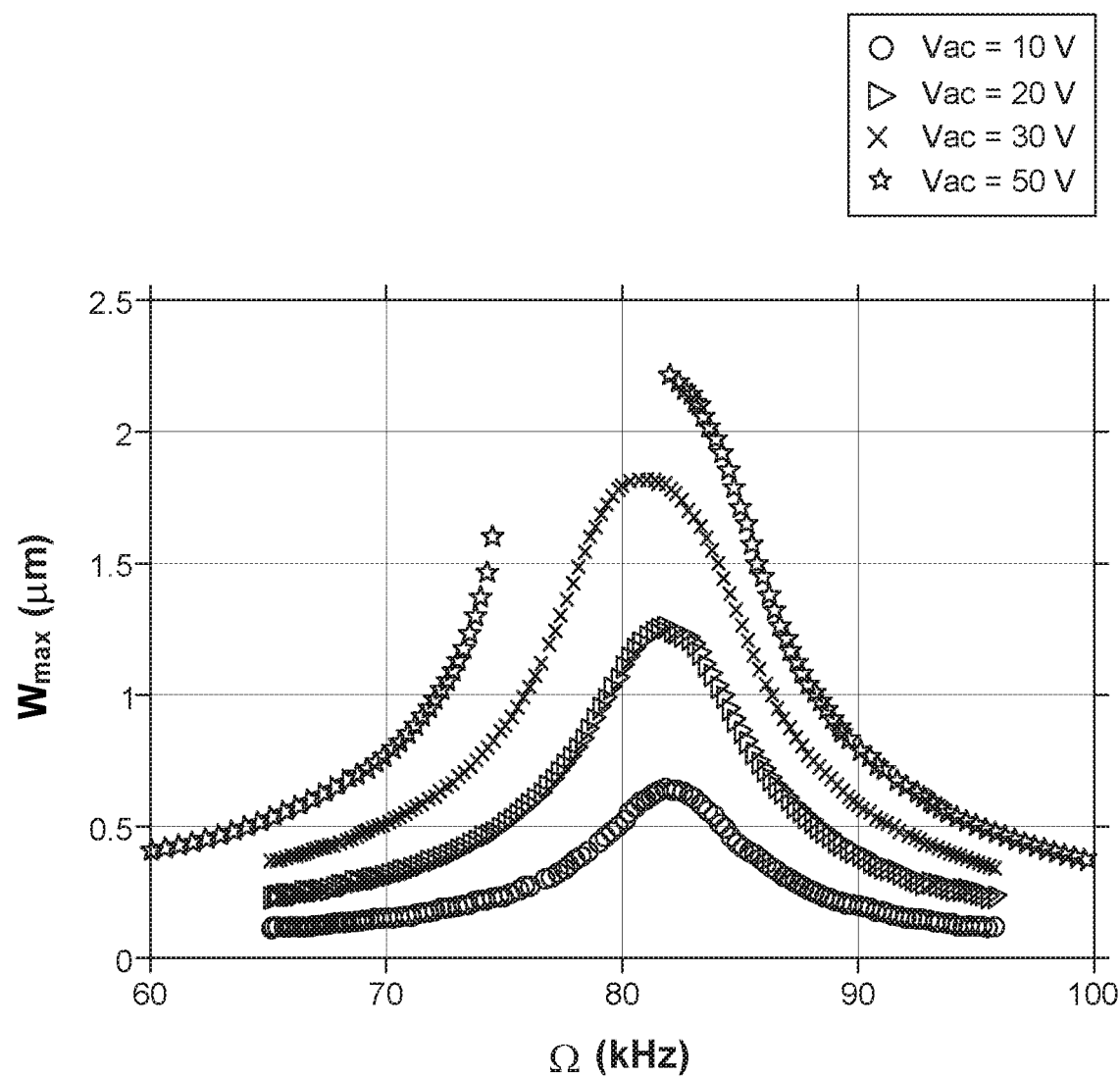
FIGS. 5A-5C are graphs illustrating the frequency response of a resonating structure according to embodiments.
Figure 5B:
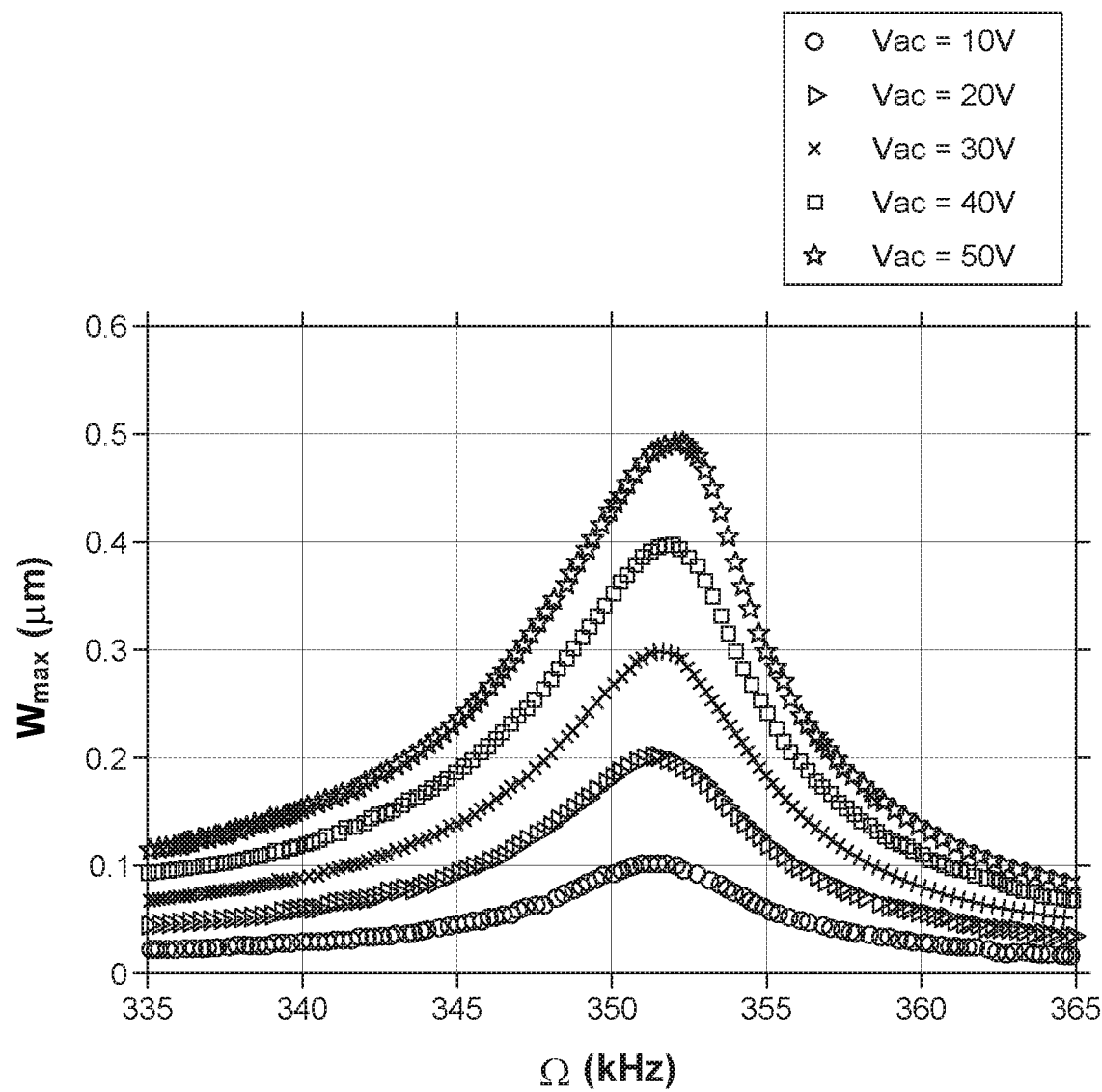

Next, the resonating structure was actuated with a harmonic AC signal superimposed on DC voltage, the frequency of the AC signal was swept around the mode of interest while using the laser to monitor the response time of the resonating structure. The frequency response curves were generated by taking the maximum steady state amplitude $W_{max}$ at each frequency step. The results of this frequency sweep for $V_{DC}$=30 V and at an atmospheric pressure near the first and third mode of vibration for different $V_{AC}$ values is illustrated in FIGS. 5A and 5B, respectively. As will be appreciated from both of these figures, as the voltage for the particular mode increases, the height of the corresponding peak likewise increases, while the frequency of location of the corresponding peaks does not significantly vary depending upon the voltage for the particular vibration mode. It should be noted that the break in the plot for $V_{ac}$=50 V in FIG. 5A corresponds to a collapse in the resonating structure due to activation of the dynamic pull-in band. It should also be noted that none of the plots in FIG. 5B for the various voltage amplitude values for the second voltage source driving the third vibration mode exhibit a similar break. This is due to the fact that activating the dynamic pull-in band for the third vibration mode requires extremely high voltage amplitudes, which far exceed voltage amplitudes that can be practically generated when the combined vapor and/or gas concentration sensor and switch is implemented in a practical application.

These frequency response curves assisted in the selection of the appropriate actuating voltages to obtain a large signal-to-noise ratio. Also, the frequency response curves were employed for converting the measured amplitude change due to water vapor adsorption into frequency values. The frequency values are important in quantifying the amount of adsorbed mass and characterizing the MOFs coating material.

Figure 5C:
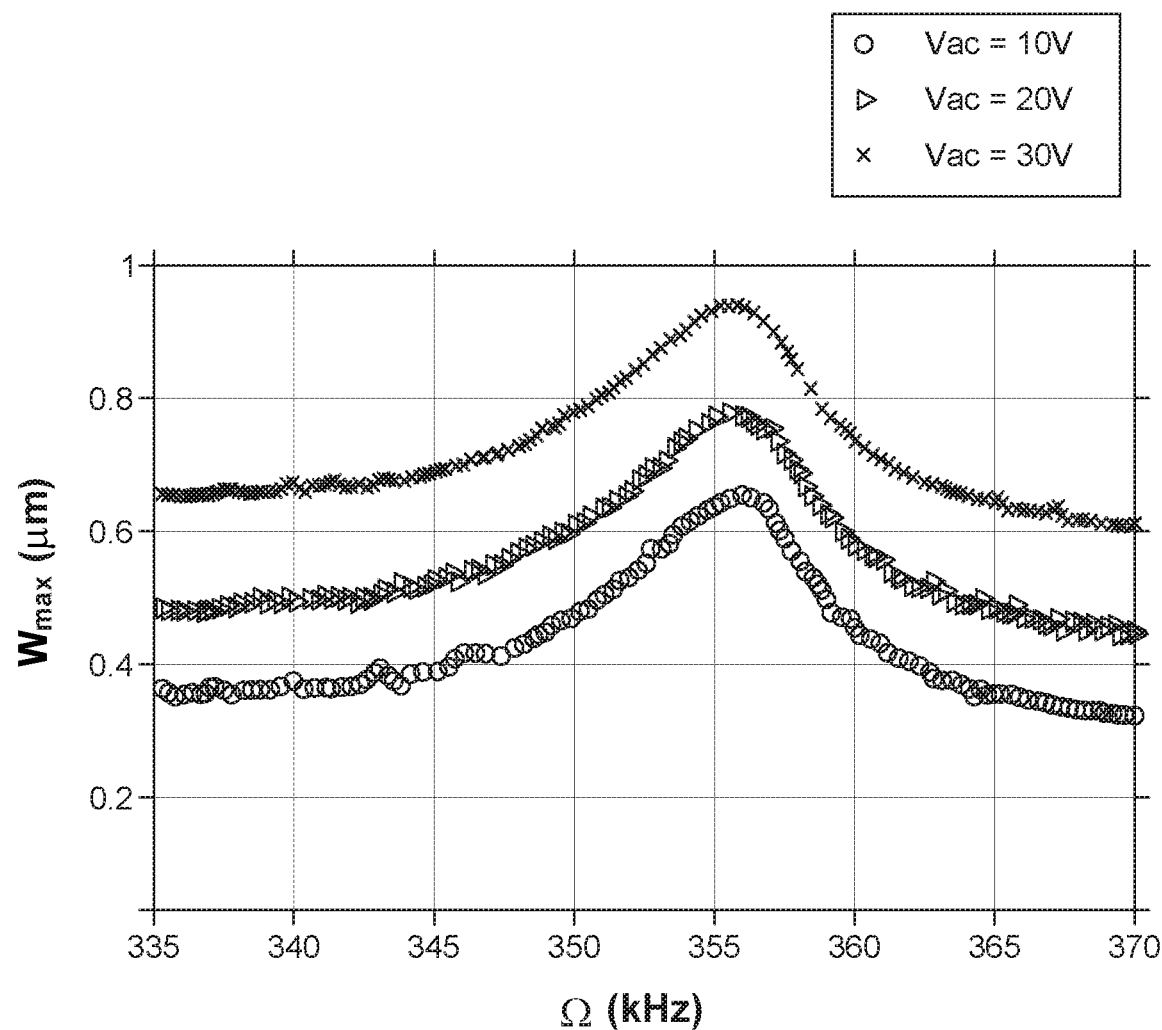

FIG. 5C illustrates the response of the resonating structure to a multifrequency excitation signal composed of two AC signals, $V_{AC1}$ and $V_{AC2}$, superimposed to a DC voltage source $V_{DC}$. The first source frequency $\Omega_1$ was fixed near the first mode (75 kHz) and the second source frequency $\Omega_2$ was swept around the third mode of vibration. As will be appreciated by comparing FIGS. 5B and 5C, the multimodal excitation raised the floor of the third vibration mode above the noise level, which facilitates detecting the response near the higher order modes of vibration. Thus, using both the first and third vibration modes of the resonating structure not only allows for determining vapor and/or gas concentration and switching, but also improves the ability to use the more accurate concentration measurements of the third vibration mode.

In order to evaluate the sensor stability, the response of the resonating structure over the time due to a multifrequency excitation was monitored. The actuation signal was composed of two AC signals of frequencies $\Omega_1$=75 kHz and $\Omega_2$=340 kHz near the first and third vibration modes, respectively. LabVIEW software was employed to convert the real-time data of the resonating structure into frequency spectra. From the resulting frequency spectra, the amplitude at each mode was recorded over a fifteen-minute period of time. The measured response demonstrated the enhanced stability near the third vibration mode, the reported amplitude fluctuation at the third vibration mode was less than 3 nm compared with 20 nm near the first vibration mode. This fluctuation can be attributed various sources of noise including adsorption-desorption noise, temperature fluctuation, and thermomechanical noise.

The Allan deviation was calculated to further investigate the stability of the resonating structure. Accordingly, the measured amplitude fluctuation at each vibration mode was converted into frequency using the suitable frequency response curves for the first and third vibration modes depicted in FIGS. 5A and 5B, respectively. Because the noise test was conducted at $V_{DC}$=30 V, $V_{AC1}$=20 V and $V_{AC2}$=40 V, the triangles curve in FIG. 5A ($1^{st}$ vibration mode) and the squares curve in FIG. 5B ($3^{rd}$ vibration mode) were used to convert the amplitude fluctuation into frequency. The Allan deviation can be expressed as:

$$\sigma_f(\tau) = \sqrt{\frac{1}{2(N-1)} \sum_{i=1}^{N-1} (\overline{f}_{i+1}^\tau - \overline{f}_i^\tau)^2} \quad (1)$$

where N is the sample size and $\overline{f}_i^\tau$ is the average frequency fluctuation over the ith time interval $\tau$ defined as:

$$\overline{f}_i(\tau) = \frac{f(i) - f_0}{f_0} \quad (2)$$

where f(i) is the measured frequency at the time step i, and $f_0$ is the resonator nominal frequency.

The calculated Allan deviation curves exhibited a typical mechanical resonator behavior. For short period of time the fluctuation is dominated by white noise, whereas for higher integration time the fluctuation increases due to random walk and steady drift. Also, the reported Allan deviation values at $\tau$=100 s show the improved stability near the third vibration mode $\sigma_{f3}(100)$=21.1 ppm compared to $\sigma_{f1}(100)$ =557 ppm near the first vibration mode. Accordingly, the corresponding frequency fluctuations near the first and third vibration modes were $\Delta f_1$=42 Hz and $\Delta f_3$=7 Hz, respectively.

The resonating structure's out-of-plane vibration generates axial stress that changes the stiffness of the resonating structure, which can affect the frequency of the excited mode (self-tuning) or the frequency of the other modes (cross-tuning). To simplify the analysis, the operating frequencies were selected such that the frequency shift due to the cross-tuning was negligible. Two tests were conducted to experimentally identify these frequencies, one in which the frequency of the second AC voltage source was fixed at 344 kHz while sweeping the frequency of the first AC voltage source and one in which the frequency of the first AC voltage source was fixed at 75 kHz while sweeping the frequency of the second AC voltage source.

When the second AC voltage source was fixed at 344 kHz while sweeping the frequency of the first AC voltage source, the recorded dip in the third vibration mode amplitude is maximum near the first mode peak due to the mode cross-tuning. However, the measured amplitude fluctuation is minimal when moving away from the third vibration mode peak and this can be attributed to the different noise sources.

When the first AC voltage source was fixed at 75 kHz while sweeping the frequency of the second AC voltage source, the multimodal interaction was minimal up to frequency value of 347 kHz. As water gets adsorbed on the surface of the resonating structure, the amplitude of vibration increases following the left branch of the frequency response curve. In the experiments, the first AC voltage source was fixed at 75 kHz, which is adjacent to the first vibration mode, and the second AC voltage source was fixed at 344 kHz, which is adjacent to the third vibration mode. These values provide a working range up to 3 kHz near the first vibration mode and 4 kHz near the third vibration mode with negligible effect of multimode interaction.

In order to test the sensitivity of the resonating structure, the testing chamber was flushed with nitrogen at a flow rate of 2 L/min for extended period of time prior to exposing the resonating structure to water vapor. The resonating structure was then exposed to water vapor while the change in the amplitude of vibration was monitored. As water molecules get adsorbed on the surface of the resonating structure, the amplitude of vibration at the selected operating points increase following the left branch of the frequency response curves. The water vapor concentration was controlled by controlling the flow ratio between the bubbler line and the dry nitrogen line. The water vapor concentration values were calculated using known methods. The repeatability was demonstrated by replacing the water vapor flow with nitrogen to flush the resonating structure and return to the original state; this process is repeated for two cycles. The response of the resonating structure to the different levels of water vapor concentrations demonstrated that the frequency shift rises linearly as the water vapor concentration increased. Reversibility was ensured by completely flushing the device after each exposure cycle. The experimentally calculated responsivity near the first vibration mode $\Re_{c_{wv}}^{1st}$=0.43 Hz/ppm and $\Re_{c_{wv}}^{3rd}$=0.65 Hz/ppm demonstrate the enhanced sensitivity near the higher order vibration modes. From the noise analysis, the minimum detectable gas concentration is 4.5 ppm near the third vibration mode.

Figure 6A:
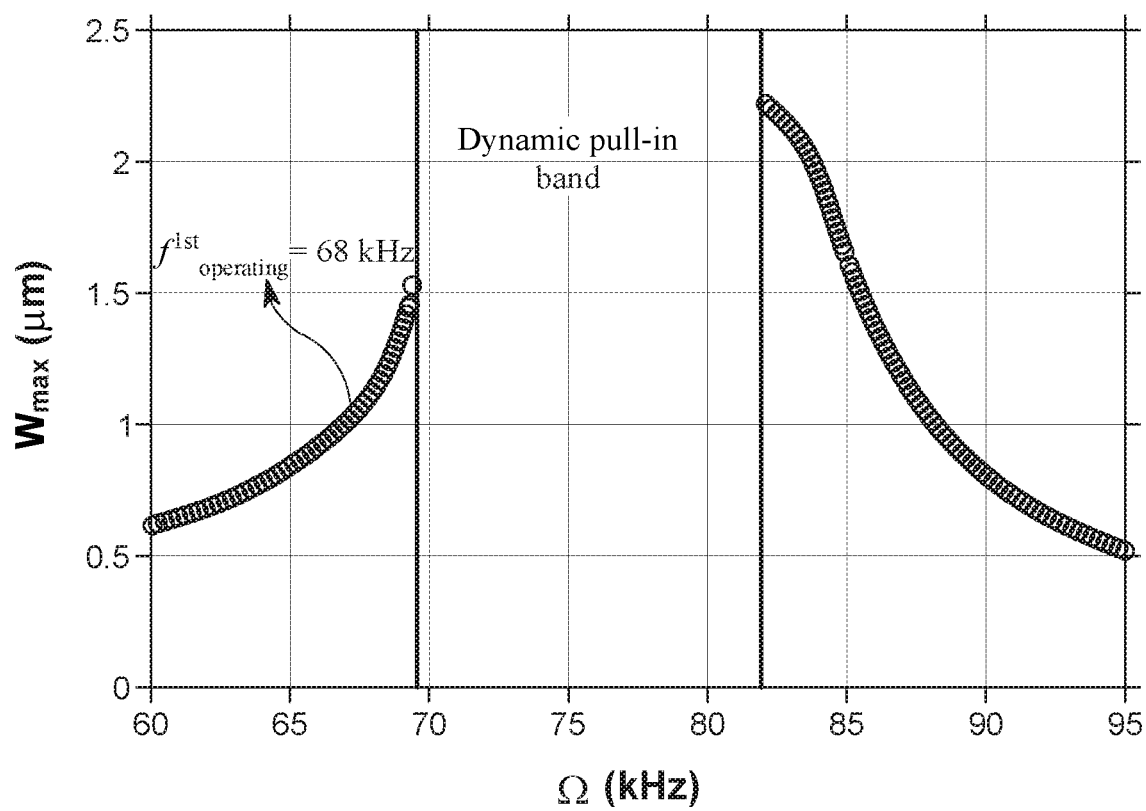
FIGS. 6A and 6B are graphs illustrating the frequency response of a resonating structure according to embodiments.
Figure 6B:
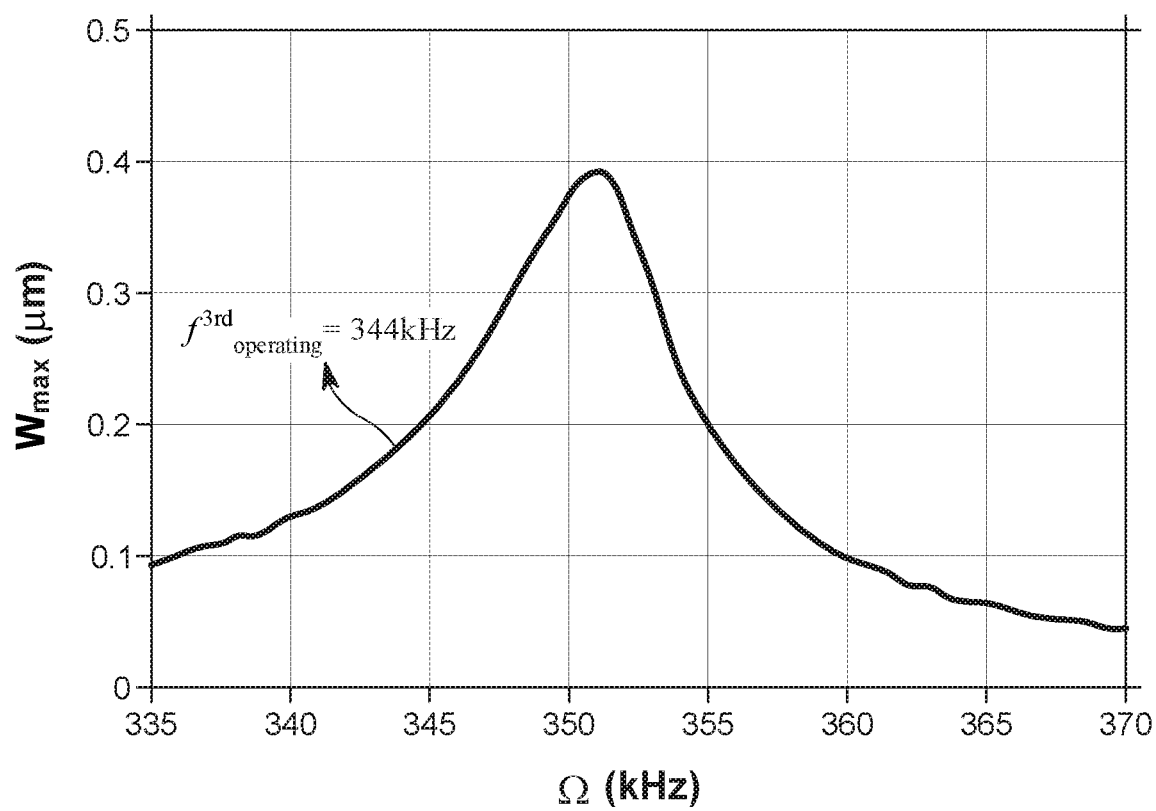

As discussed above, the resonating structure can act as a switch when the vapor and/or gas concentration exceeded a certain threshold value while accurately measuring the vapor and/or gas concentration. Although, this can be employed to detect any type of poisoning gas, the experiment utilized water vapor for safety reasons. The resonating structure was actuated with a harmonic signal that has two frequencies $\Omega_1$ and $\Omega_2$ with AC amplitudes $V_{AC1}$ and $V_{AC2}$ superimposed to a DC voltage. $V_{AC1}$ was selected such that the frequency response near the first mode shows a nonlinear response with dynamic pull-in band (see FIG. 6a), while $\Omega_1$ was tuned to be close to the dynamic pull-in band of the first vibration mode. The difference between $\Omega_1$ and the bifurcation frequency defines the threshold concentration value after which the resonating structure collapses due to dynamic pull-in, which can be accordingly used to realize an electrical switch. $V_{AC2}$ was chosen such that a linear response is reported near the third mode as illustrated in FIG. 6b. $\Omega_2$ was set to be close to the linear response of the third vibration mode. As water molecules get adsorbed on the surface of the resonating structure, the resonance frequencies decrease and the corresponding amplitudes at each excitation frequency increase following the left branch of the frequency response curves shown in FIGS. 6a and 6b.

For purposes of evaluation, a water vapor concentration of 3260 ppm was arbitrarily selected as the threshold value. When operating the resonating structure in the linear regime, a water vapor concentration of 3260 ppm shifts the first vibration mode frequency by 1.78 kHz and the third vibration mode by 2.455 kHz. In order to experimentally demonstrate the concept of smart switching (i.e., causing the resonating structure to collapse at a predetermined water vapor concentration), the frequency and amplitude of the first AC voltage source were respectively fixed at $\Omega_1=68$ kHz (first vibration mode) and $V_{AC1}=50$ V, the frequency and amplitude of the second AC voltage source were respectively fixed at $\Omega_2=344$ kHz (third vibration mode) and amplitude $V_{AC2}=40$ V, and the DC bias voltage was fixed at $V_{DC}=30$ V.

It has been demonstrated that the stability of the resonator at particular operating frequency depends on the largeness of the safe basin of attraction. As the driving frequency approaches the bifurcation frequency, the safe basin of attraction gets eroded and shrinks in size. Accordingly, in order to ensure the stability of the resonator at the operating points, the amplitude fluctuation over time due to noise was monitored. The calculated Allan deviation near the first and third mode of vibrations were $\sigma_{f1}(100)=388$ ppm and $\sigma_{f3}(100)=6$ ppm, which respectively correspond to frequency fluctuations of $\Delta f_1=26$ Hz and $\Delta f_3=26$ Hz. The resonating structure was then exposed to water vapor at the threshold concentration of 3260 ppm. When the frequency shift near the first vibration mode exceeds the threshold value (~1.8 kHz), the resonating structure collapses into the symmetric electrode. However, the measured frequency shift near the third vibration mode was 1.6 kHz, which was less than the expected value at this concentration. In the vicinity of the bifurcation frequency, the noise influence becomes significant, and accordingly the measured frequency shift near the first vibration mode can be attributed to the combined effect of noise and water adsorption on the surface of the resonating structure. The reported results show the significance of this technique in accurately measuring the concentration of water vapor while still being able to switch if the concentration exceeds beyond a certain safe value.

In the experiments the threshold concentration was set at 3260 ppm. However, the measured frequency shift near the third vibration mode, which as discussed above is more accurate than the frequency shift near the first vibration mode, indicates that the switching occurred at 1924 ppm. Analytically, the robustness of bifurcation-based vapor and/or gas sensors can be investigated by conducting the global dynamics analysis on the stable solution before the pull-in, which can be used to identify the range of stable solutions were the noise effect is negligible. Specifically, this deviation between the vapor and/or gas concentrations determined using the first and third vibration modes can be compensated for by adjusting the frequency applied to the resonating structure by the first AC voltage source so that the concentration measurement obtained using the first vibration mode is compensated for and the frequency shift in the pull-in mode more closely tracks the actual concentration, such as the more accurate concentration determined using the third vibration mode.

The disclosed combined vapor and/or gas concentration sensor and switch is capable of detecting the concentration of a particular vapor and/or gas and perform switching upon exceeding certain threshold value. This is based on simultaneously actuating the resonating structure near the pull-in band of the first vibration mode and the linear response of the third vibration mode. The experiments measuring the environmental humidity revealed a minimum detectable water vapor concentration of 4.5 ppm near the third vibration mode. This can be easily extended to detect more poisonous gasses by functionalizing the resonating structure with suitable coating material. Also, the disclosed combined vapor and/or gas concentration sensor and switch can be utilized extended to smartly detect other physical stimuli, such as temperature and pressure. Optimizing the design of the resonating structure to excite higher order vibration modes will open the door for simultaneously measuring multiple physical stimuli using single resonating structure, which reduces the power consumption, device size, and cost.

The disclosed embodiments provide a combined vapor and/or gas concentration sensor and switch. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A combined vapor and/or gas concentration sensor and switch, comprising:

a resonating structure having a first side with a functionalized surface and a second side that is opposite the first side, wherein the resonating structure has a first resonant frequency of a first vibration mode and a third resonant frequency of a third vibration mode, wherein the resonating structure is a resonating microstructure or nanostructure, and wherein the third resonant frequency is higher than the first resonant frequency;

a drive electrode and a sensing electrode arranged facing the second side of the resonating structure;

a direct current bias source coupled to the resonating structure;

a first alternating current, AC, voltage source coupled to the drive electrode, wherein the first AC voltage source provides the resonating structure, via the drive electrode, with a first voltage having an amplitude causing the first vibration mode of the resonating structure to exhibit a pull-in band and having a first frequency response adjacent to the pull-in band of the first vibration mode, wherein the first frequency response is nonlinear;

a second AC voltage source coupled to the drive electrode, wherein the second AC voltage source provides the resonating structure, via the drive electrode, with a second voltage having a frequency so that a second frequency response of the resonant structure, adjacent to the third vibration mode, is linear; and a read-out circuit coupled to the sensing electrode, wherein the read-out circuit is configured to determine a vapor and/or gas concentration based on a difference between (1) the frequency of the second voltage supplied by the second AC voltage source and (2) a frequency obtained by the read-out circuit from the resonating structure via the sensing electrode.

2. The combined vapor and/or gas concentration sensor and switch of claim 1, wherein the drive and sensing electrodes are symmetrically arranged across a length of the resonating structure.

3. The combined vapor and/or gas concentration sensor and switch of claim 1, wherein the first side of the resonating structure comprises metal organic framework that functionalizes the first side to detect a particular type of vapor and/or gas.

4. The combined vapor and/or gas concentration sensor and switch of claim 1, further comprising:
a substrate on which the drive electrode, sensing electrode, and the resonating structure are arranged.

5. The combined vapor and/or gas concentration sensor and switch of claim 4, wherein a plurality of perforations pass through the drive electrode and the substrate.

6. The combined vapor and/or gas concentration sensor and switch of claim 4, wherein the resonating structure is a clamped-clamped beam, the combined vapor and/or gas concentration sensor and switch further comprising:
first and second posts interposed between the resonating structure and the substrate.

7. The combined vapor and/or gas concentration sensor and switch of claim 4, wherein the resonating structure is a cantilever beam, the combined vapor and/or gas concentration sensor and switch further comprising:
a single post interposed between the resonating structure and the substrate.

8. The combined vapor and/or gas concentration sensor and switch of claim 1, wherein the resonating structure comprises a polymer interposed between first and second electrical contact layers.

9. The combined vapor and/or gas concentration sensor and switch of claim 1, wherein the first AC voltage source and the second AC voltage source are coupled to the drive electrode in series.

10. The combined vapor and/or gas concentration sensor and switch of claim 1, wherein the first and second resonant frequencies depend upon a geometry of the resonating structure and a material comprising the resonating structure.

11. A method for a combined vapor and/or gas concentration sensor and switch, the method comprising:
applying a direct current bias voltage to a resonating structure, wherein the resonating structure has a first side with a functionalized surface and a second side that is opposite the first side, wherein the resonating structure has a first resonant frequency of a first vibration mode and a third resonant frequency of a third vibration mode, the third resonant frequency being higher than the first resonant frequency, and wherein the resonating structure is a resonating microstructure or nanostructure;

applying a first alternating current, AC, voltage to the resonating structure via a drive electrode, which is arranged facing the second side of the resonating structure, wherein the first AC voltage provides the drive electrode with a first voltage having an amplitude causing the first vibration mode of the resonating structure to exhibit a pull-in band and having a first frequency response adjacent to the pull-in band of the first vibration mode, wherein the first frequency response is linear;

applying a second AC voltage simultaneously with the first AC voltage, to the resonating structure via the drive electrode, wherein the second AC voltage has a frequency so that a second frequency response of the resonant structure, adjacent to the third vibration mode, is linear;

determining the vapor and/or gas concentration based on a difference between (1) the frequency of the second AC voltage and (2) a read-out frequency of a read-out circuit; and collapsing the resonating structure responsive to the vapor and/or gas concentration exceeding a predetermined concentration.

12. The method of claim 11, wherein the collapsing of the resonating structure is based on a shift in frequency applied by the first AC voltage source to the resonating structure.

13. The method of claim 11, further comprising:
selecting the frequency of the first voltage based on the predetermined concentration.

14. The method of claim 13, wherein the selection of the frequency of the first voltage based on the predetermined concentration vapor and/or gas concentration comprises:
determining a frequency shift of the first mode of the resonating structure when the resonating structure is exposed to the predetermined concentration;
selecting the frequency of the first voltage to be a frequency that is a difference between an initial frequency of the pull-in band of the first mode and the determined frequency shift.

15. The method of claim 11, wherein the amplitude of the first AC voltage is greater than an amplitude of the second AC voltage.

16. A method for forming a combined vapor and/or gas concentration sensor and switch, the method comprising:
providing a resonating structure, a drive electrode, and a sensing electrode, wherein the resonating structure has a first side with a functionalized surface and a second side that is opposite the first side, wherein the resonating structure has a first resonant frequency of a first vibration mode and a third resonant frequency of a third vibration mode, wherein the resonating structure is a resonating microstructure or nanostructure, wherein the drive and sensing electrodes face the second side of the resonating structure, and wherein the third resonant frequency is higher than the first resonant frequency;

coupling a direct current bias source to the resonating structure;

coupling a first alternating current, AC, voltage source to the drive electrode, wherein the first AC voltage source provides the resonating structure, via the drive electrode, with a first voltage having an amplitude causing the first vibration mode of the resonating structure to exhibit a pull-in band and having a first frequency response adjacent to the pull-in band of the first vibration mode, wherein the first frequency response is non-linear;

coupling a second AC voltage source to the drive electrode, wherein the second AC voltage source provides the resonating structure, via the drive electrode, with a second voltage having a frequency so that a second frequency response of the resonant structure, adjacent to the third vibration mode, is linear; and coupling a read-out circuit to the sensing electrode, wherein the read-out circuit is configured to determine a vapor and/or gas concentration based on a difference between (1) the frequency of the second voltage supplied by the second AC voltage source and (2) a frequency obtained by the read-out circuit from the resonating structure via the sensing electrode.

17. The method of claim 16, further comprising:
arranging the drive and sensing electrodes and the resonating structure on a substrate.

18. The method of claim 17, further comprising:
forming a plurality of perforations through the drive electrode and the substrate.

19. The method of claim 16, wherein the resonating structure is a clamped-clamped beam, the method further comprising:
interposing first and second posts between the resonating structure and the substrate.

20. The method of claim 16, wherein the resonating structure is a cantilever beam, the method further comprising:
interposing a single post between the resonating structure and the substrate.

* * * * *